US011203437B2

(12) United States Patent
Epp et al.

(10) Patent No.: US 11,203,437 B2
(45) Date of Patent: Dec. 21, 2021

(54) ASSEMBLY AND METHOD FOR CONDITIONING ENGINE-HEATED AIR ONBOARD AN AIRCRAFT

(71) Applicant: BOMBARDIER INC., Dorval (CA)

(72) Inventors: Duane Epp, Ajax (CA); Ignatius Tsui, Markham (CA)

(73) Assignee: BOMBARDIER INC., Dorval (CA)

( * ) Notice: Subject to any disclaimer, the term of this patent is extended or adjusted under 35 U.S.C. 154(b) by 423 days.

(21) Appl. No.: 16/311,797

(22) PCT Filed: Jun. 28, 2017

(86) PCT No.: PCT/IB2017/053887
§ 371 (c)(1),
(2) Date: Dec. 20, 2018

(87) PCT Pub. No.: WO2018/002855
PCT Pub. Date: Jan. 4, 2018

(65) Prior Publication Data
US 2019/0202567 A1    Jul. 4, 2019

Related U.S. Application Data

(60) Provisional application No. 62/357,256, filed on Jun. 30, 2016.

(51) Int. Cl.
*B64D 15/04* (2006.01)
*B64D 13/08* (2006.01)
(Continued)

(52) U.S. Cl.
CPC ............ *B64D 15/04* (2013.01); *B64D 13/08* (2013.01); *B64D 33/00* (2013.01);
(Continued)

(58) Field of Classification Search
CPC ............ B64D 15/04; B64D 2013/0607; B64D 2013/064; B64D 2013/0618; B64D 2027/264; B64D 2027/262
See application file for complete search history.

(56) References Cited

U.S. PATENT DOCUMENTS 5,137,230 A * 8/1992 Coffinberry ............ B64D 13/06
244/118.5
5,203,163 A * 4/1993 Parsons ..................... F02C 6/08
60/226.1
(Continued)

FOREIGN PATENT DOCUMENTS

| EP | 0517459 A1 | 9/1992 |
| WO | 2012125895 A1 | 9/2012 |
| WO | 2015092251 A1 | 6/2015 |

OTHER PUBLICATIONS

PCT international Search Report and Written Opinion dated Sep. 27, 2017, re: International Application No. PCT/IB2017/053887.
(Continued)

*Primary Examiner* — Christopher D Hutchens
(74) *Attorney, Agent, or Firm* — Norton Rose Fulbright Canada LLP (57) ABSTRACT

Apparatus and method for conditioning engine-heated air onboard an aircraft including a heat exchanger (140) at least partially disposed in a pylon structure (118) for supporting an engine (134) of the aircraft. The pylon heat exchanger (140) extracts heat from a flow (156) of engine-heated air. A flow (142) of ambient air is provided to the pylon heat exchanger (140) from a ram air inlet (150).

20 Claims, 8 Drawing Sheets

(51) Int. Cl.
  *B64D 33/00*  (2006.01)
  *B64D 13/06*  (2006.01)
  *B64D 27/26*  (2006.01)

(52) U.S. Cl.
  CPC .............. *B64D 2013/0607* (2013.01); *B64D 2013/0618* (2013.01); *B64D 2027/262* (2013.01); *Y02T 50/50* (2013.01)

(56) References Cited

U.S. PATENT DOCUMENTS

| | | | |
|---|---|---|---|
| 6,715,713 B2* | 4/2004 | Marche | B64D 13/00 165/166 |
| 8,061,649 B2 | 11/2011 | Journade et al. | |
| 8,459,588 B2 | 6/2013 | Diochon et al. | |
| 8,522,529 B2 | 9/2013 | Martinou et al. | |
| 8,826,641 B2 | 9/2014 | Suciu et al. | |
| 8,904,753 B2 | 12/2014 | Murphy | |
| 9,062,604 B2* | 6/2015 | DeFrancesco | F02C 9/18 |
| 9,239,005 B2 | 1/2016 | Strecker et al. | |
| 2002/0179773 A1* | 12/2002 | Breer | B64D 15/04 244/134 R |
| 2009/0188232 A1 | 7/2009 | Suciu et al. | |
| 2009/0188234 A1* | 7/2009 | Suciu | F02C 7/14 60/262 |
| 2009/0301101 A1 | 12/2009 | Marche | |
| 2011/0108662 A1 | 5/2011 | Diochon et al. | |
| 2012/0080555 A1* | 4/2012 | Lafont | B64D 27/26 244/54 |
| 2013/0133334 A1* | 5/2013 | Strecker | F02C 7/18 60/782 |
| 2013/0333390 A1* | 12/2013 | Barkowsky | F01D 17/105 60/782 |
| 2015/0167552 A1* | 6/2015 | Prouteau | F02C 7/18 137/15.1 |
| 2015/0275769 A1* | 10/2015 | Foutch | F02C 7/27 60/776 |
| 2015/0284098 A1 | 10/2015 | Leyko et al. | |
| 2015/0291284 A1 | 10/2015 | Victor et al. | |
| 2015/0360786 A1* | 12/2015 | Oberpriller | B64D 13/08 165/51 |
| 2016/0084165 A1* | 3/2016 | Packard | B64C 21/04 60/782 |
| 2016/0160758 A1* | 6/2016 | Marchaj | F02K 3/06 60/779 |
| 2016/0311551 A1* | 10/2016 | Daniello | F02C 7/32 |
| 2017/0074167 A1* | 3/2017 | Alstad | F02C 7/185 |
| 2017/0184030 A1* | 6/2017 | Brousseau | B64D 13/08 |
| 2018/0187602 A1* | 7/2018 | Snape | F02C 9/18 |

OTHER PUBLICATIONS

English translation of patent document No. WO 2015092251 dated Jun. 25, 2015, https://patents.google.com/patent/WO2015092251A1/en?oq=WO+2015092251, accessed on Dec. 12, 2018.

* cited by examiner

ASSEMBLY AND METHOD FOR CONDITIONING ENGINE-HEATED AIR ONBOARD AN AIRCRAFT

CROSS-REFERENCE TO RELATED APPLICATION(S)

The present application is a national phase application under 35 U.S.C. 371 of International Patent Application No. PCT/IB2017/053887 filed on Jun. 28, 2017, which claims priority from U.S. Provisional Patent Application Ser. No. 62/357,256 filed on Jun. 30, 2016, the entire contents of which are incorporated herein by reference.

FIELD

This relates to aircraft air supply systems, and more particularly, to methods and assemblies for conditioning engine-heated air onboard an aircraft.

BACKGROUND

Many aircraft have one or more systems which require a supply of heated air. For example, cabin environmental control systems and wing anti-icing systems use bleed air to control temperatures in sections of an aircraft.

Relatively hot compressor bleed air may be delivered to such systems from the engines. In particular, bleed air from the engines may be delivered to one or more systems of the aircraft.

However, bleed air from the engines may be too hot for use in some systems. Accordingly, such air may be cooled using a heat exchanger. Cooling performance of a heat exchanger may depend, for example, on the size of the heat exchanger, the temperature difference between hot and cold sides of the heat exchanger, and the flow of air on the hot and cold sides. However, limited space is available in an aircraft. Accordingly, it may be difficult to provide air conditioning systems with sufficient cooling capacity.

SUMMARY

An example assembly for conditioning engine-heated air onboard an aircraft comprises: a pylon structure for supporting an engine of the aircraft, the pylon structure defining an internal volume; a pylon heat exchanger at least partially disposed in the internal volume defined by the pylon structure, the pylon heat exchanger being configured to use a flow of ambient air to extract heat from a flow of engine-heated air; and a ram air inlet for receiving the flow of ambient air for use by the heat exchanger.

The assembly may comprise an engine-heated air supply duct in fluid communication with a nacelle heat exchanger located in an engine nacelle of the aircraft to route the flow of engine-heated air to the pylon heat exchanger.

The engine-heated air supply duct may have an outlet for routing engine-heated air to a wing anti ice system.

The assembly may comprise an output duct in fluid communication with an environmental control system of the aircraft for routing the engine-heated air to the environmental control system after passing through the pylon heat exchanger.

The ram air inlet may be configured to convert dynamic pressure of the ambient air flow due to motion of the aircraft into static pressure.

The ram air inlet may comprise an inlet recessed in an outer skin of the pylon.

The ram air inlet may comprise a NACA inlet.

The assembly may comprise an exhaust outlet formed in an outer skin of the pylon for discharging air from the pylon heat exchanger.

The assembly may comprise a bypass duct for routing engine-heated air around the pylon heat exchanger to an output communicating with a system of the aircraft.

The pylon may be configured to secure the engine to a fuselage of the aircraft.

The pylon heat exchanger may be fastened to a structural rib of the pylon.

The pylon heat exchanger may abut the structural rib.

An example aircraft comprises an assembly having features as recited above.

The aircraft may comprise a wing anti ice system and a duct for routing air from the engine-heated air supply duct to the wing anti ice system.

Embodiments may include combinations of the above features.

An example method of conditioning engine-heated air onboard an aircraft, comprises: receiving a flow of ambient air into a pylon of the aircraft through a ram air inlet; routing the flow of ambient air to a pylon heat exchanger at least partially disposed in the pylon; extracting heat from a flow of engine-heated air with the pylon heat exchanger.

The method may comprise converting dynamic pressure of the flow of ambient air to static pressure.

The method may comprise routing the flow of engine-heated air through a nacelle heat exchanger located upstream of the pylon heat exchanger in an engine nacelle of the aircraft.

The method may comprise routing the engine-heated air around the pylon heat exchanger to an output duct in communication with a system of the aircraft, bypassing the pylon heat exchanger.

The method may comprise routing the engine-heated air, after cooling, to an environmental control system.

The method may comprise receiving the engine-heated air at an input duct for in communication with the pylon heat exchanger and routing engine-heated air from the duct to a wing anti-ice system of the aircraft.

Embodiments may include combinations of the above features.

An example assembly for conditioning engine-heated air onboard an aircraft comprises: a pylon structure for supporting an engine of the aircraft, the pylon structure defining an internal volume; a heated air supply duct disposed at least partially within the internal volume for directing a flow of engine-heated air to a pylon heat exchanger; a ram air inlet for receiving a flow of ambient air for use by the pylon heat exchanger to extract heat from the flow of engine-heated air; and an ambient air supply duct disposed at least partially within the internal volume for directing the flow of ambient air from the ram air inlet to the pylon heat exchanger.

BRIEF DESCRIPTION OF DRAWINGS

In the figures, which depict example embodiments.

DETAILED DESCRIPTION

Disclosed herein is an assembly for conditioning engine-heated air, such as bleed air, onboard an aircraft. In some embodiments, the assembly comprises a heat exchanger at least partially disposed inside a pylon and ducting to feed engine-heated air and ambient air to the heat exchanger. The heat exchanger may cool air heated by the aircraft engine, such as engine bleed air which may be obtained from a compressor stage of the engine for use in one or more systems of the aircraft. A heat exchanger may be located in the engine nacelle to limit the length of ducting required. However, limited space may be available in the engine nacelle, which may limit cooling capacity.

Location of a heat exchanger in the pylon may reduce requirements for cooling in the engine nacelle. The pylon heat exchanger, possibly in combination with a nacelle heat exchanger, may provide sufficient cooling to reduce the temperature of engine heated air to a level suitable for use in a cabin environmental control system, and require less nacelle space, allowing compatibility with smaller nacelles.

The nacelle heat exchanger and the pylon heat exchanger may be arranged in serial flow relationship, with an outlet at an intermediate cooling stage (e.g. between a nacelle heat exchanger and a pylon heat exchanger) for providing air to another aircraft system such as a wing anti-ice system. The two separate heat exchangers may be configured to output air at multiple temperature set points, e.g. a high and a low temperature set point. Each of the two heat exchangers may be smaller and lighter than a single heat exchanger capable of outputting air at the lower set point.

Figure 1:
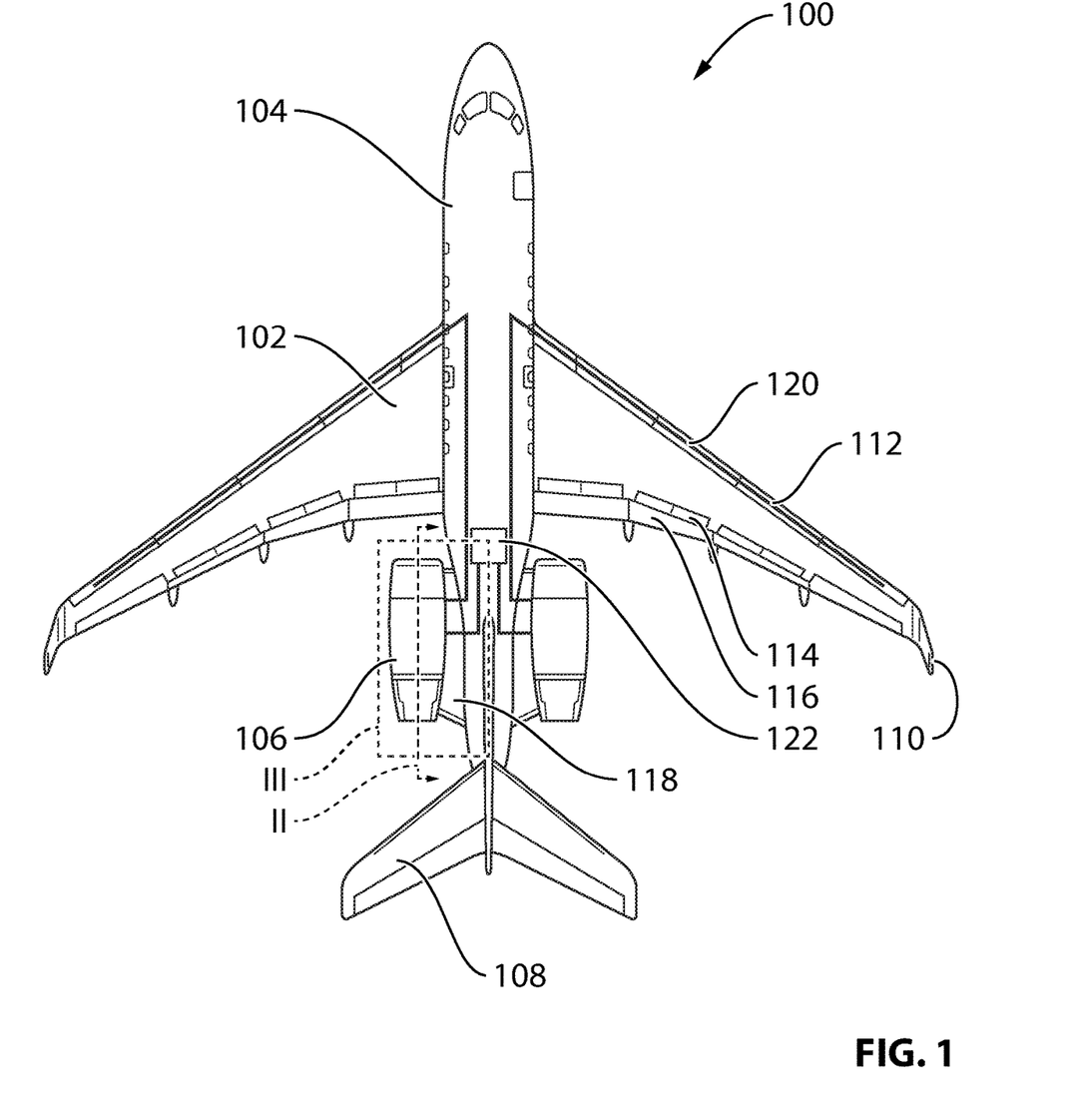
FIG. 1 is a plan view of an aircraft.

FIG. 1 is a top plan view of an example aircraft 100. Aircraft 100 may be any type of aircraft, such as corporate (e.g. business jet), private, commercial or passenger aircraft. For example, aircraft 100 may be a narrow-body, twin-engine jetliner. Aircraft 100 may be a fixed-wing aircraft.

Aircraft 100 may comprise structures such as one or more wings 102, fuselage 104, empennage including vertical and horizontal stabilizers 108, aileron(s) 110, leading edge slat(s) 112, spoiler(s) 114 and trailing edge flap(s) 116. Aircraft 100 may further comprise one or more engines 106 supported on other aircraft structures using pylons 118. Each pylon 118 may include an internal support frame (not shown) for supporting the weight of an engine 106 and associated loads, and an outer skin 119 (shown in FIGS. 4A-4C) installed around the support frame and defining an aerodynamic surface of the pylon 118. The structure and skin 119 of pylon 118 define an internal volume within the pylon 118. As depicted, engines 106 are supported on fuselage 104 by pylons 118 attached to fuselage 104. Alternatively, or in addition, one or more engines 106 may be supported on wings 102 by pylons attached to wings 102.

Leading edge slats 112 and trailing edge flaps 116 may be considered "high-lift" flight control surfaces that may be deployed to increase the amount of lift generated by wings 102 during landing, take-off and/or during any other appropriate phases of flight or conditions requiring increased lift. One or more trailing edge flaps 116 may be disposed at or near a trailing edge of each wing 102 and may define at least a portion of a trailing edge of each wing 102.

Aircraft 100 has one or more systems which circulate air through structures of the aircraft 100. For example, as depicted, aircraft 100 has a wing anti-icing system 120 and a cabin environmental control system 122. As used herein, the term wing anti-icing system refers to a system for providing warm proximate aerodynamic surfaces of an aircraft for melting of ice, prevention of ice formation, or a combination thereof.

Each of wing anti-icing system 120 and cabin environmental control system 122 uses a stream of engine-heated air which has been heated to above ambient temperature in or by one or more engines 106.

Figure 2:
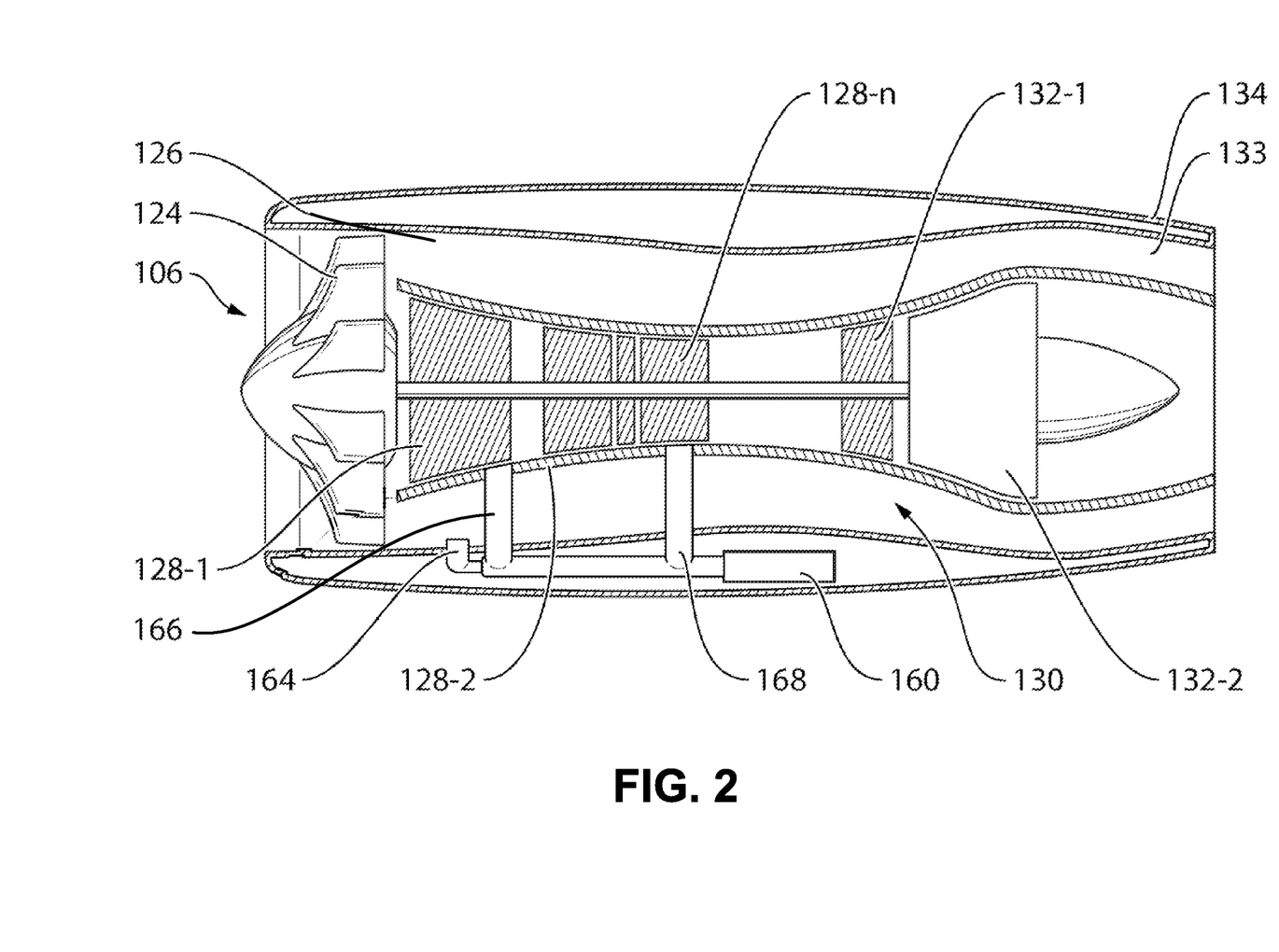
FIG. 2 is a side cross-sectional view of an engine of the aircraft of FIG. 1, along line II-II shown in FIG. 1.

FIG. 2 is an axial cross-sectional view of an engine 106 along line II-II shown in FIG. 1. Engine 106 may be, for example, a turbofan engine having a fan 124, a compressor section 126 having one or more compressor stages 128-1 through 128-$n$, and a turbine section 130 having one or more turbine stages 132-1, through 132-$n$. Engine 106 may have a bypass duct 133 routing air from fan 124 to a point downstream of turbine section 130, thereby bypassing compressor section 126 and turbine section 130. Engine 106 is housed in a nacelle 134.

As will be appreciated, temperature and pressure conditions of air may vary at different engine stages. In general, air may become hotter and more pressurized with each successive compressor stage. Conversely, air may become cooler and less pressurized with each successive turbine stage. Air may be collected from multiple stages in order to achieve an intermediate temperature.

Air taken from compressor stages of engine 106 may be hotter than desired for systems such as wing anti-ice system 120 and cabin environmental control system 122. Moreover, performance considerations, safety considerations or regulations may dictate a maximum temperature of air delivered to systems or aircraft structures. For example, flammability regulations may stipulate a maximum allowable temperature for air within wings 102 or other aircraft structures.

Accordingly, air from engine 106 may be cooled in a heat exchanger. For example, air from engine compressor stages may be cooled in a heat exchanger with bypass air.

Figure 3A:
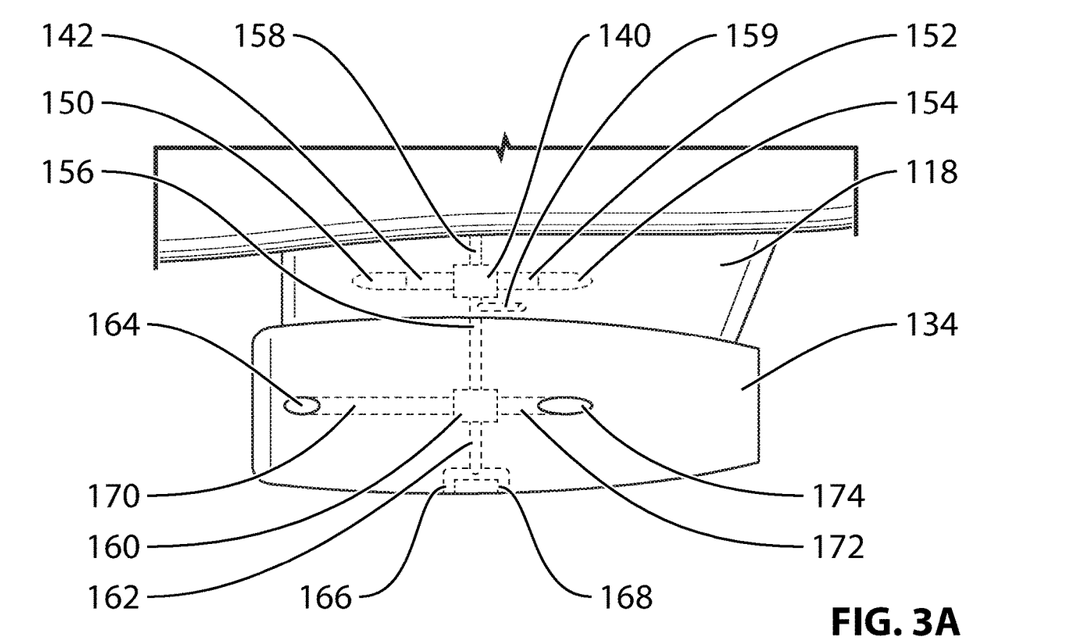
FIGS. 3A-3B are schematic top and bottom views of an engine nacelle and pylon of the aircraft of FIG. 1, as indicated by the region III in FIG. 1, with hidden features shown in broken lines.
Figure 3B:
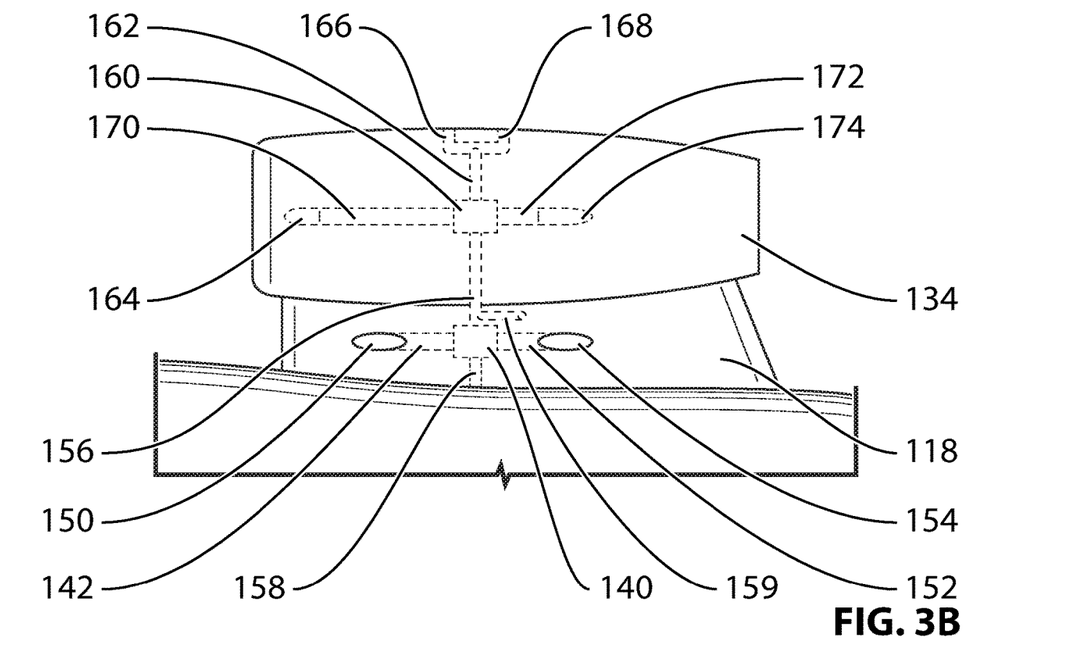

FIG. 3A is a schematic view of an example pylon 118 and engine nacelle 134. Pylon 118 may be configured to house a pylon heat exchanger 140 for cooling engine bleed air and supplying air to systems such as wing anti icing system 120 and cabin environmental control system 122.

Pylon heat exchanger 140 may be an air-to-air heat exchanger, with engine-heated air supplied on a hot side and cooling air supplied on a cold side. Suitable heat exchangers include those with sufficient cooling performance, and with sufficiently compact size and weight to fit within pylon 118.

Pylon 118 may have an ambient air supply duct 142 routing ambient cooling air to the cold side of pylon heat exchanger 140 and an engine-heated air supply duct 156 routing engine-heated air to the hot side of pylon heat exchanger 140. Pylon 118 may further have a cooling air exhaust duct 152 and a heat exchanger output duct 158.

Figure 4A:
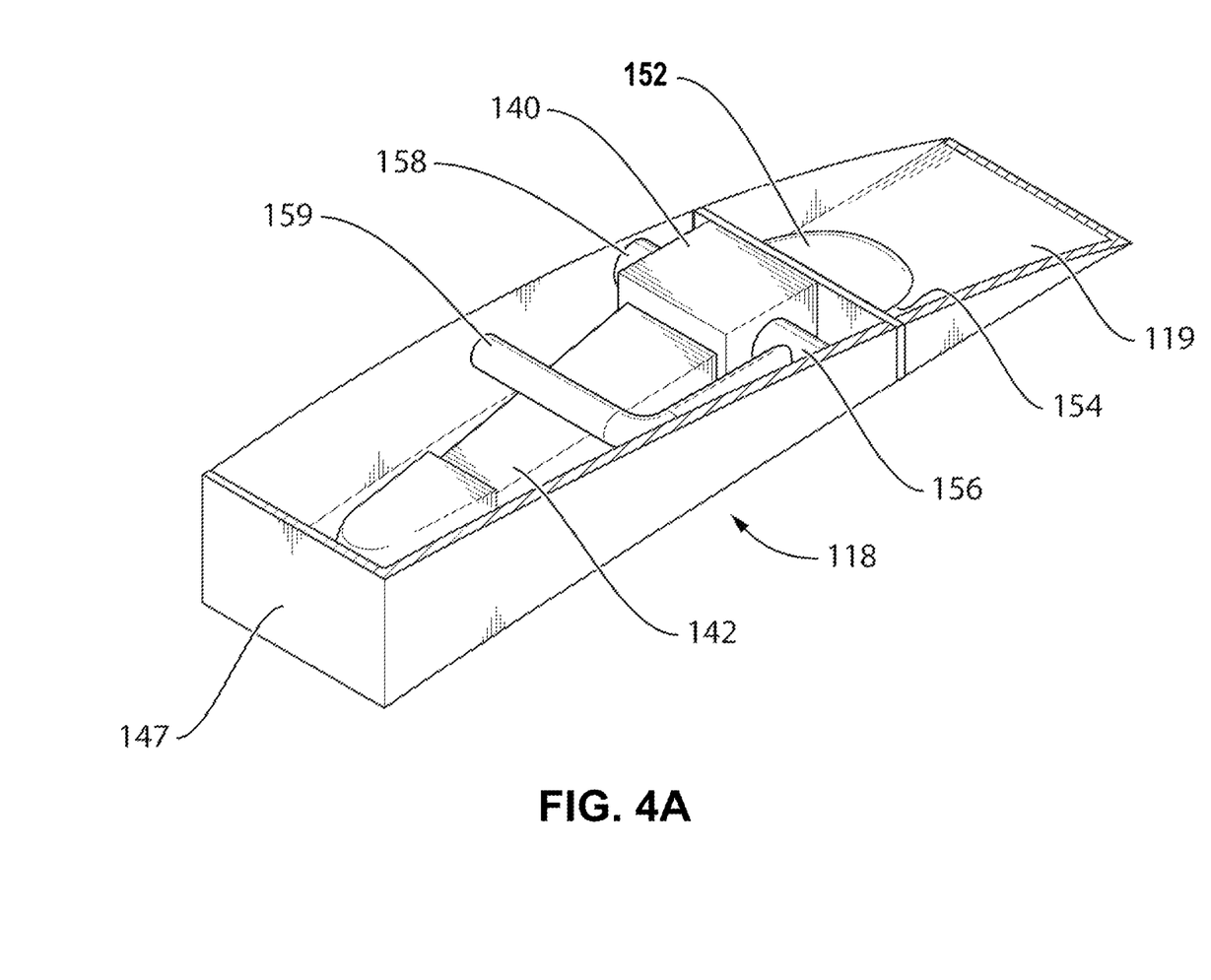
FIG. 4A is a perspective view of an aircraft pylon, with the outer skin shown as transparent to show internal components.
Figure 4B:
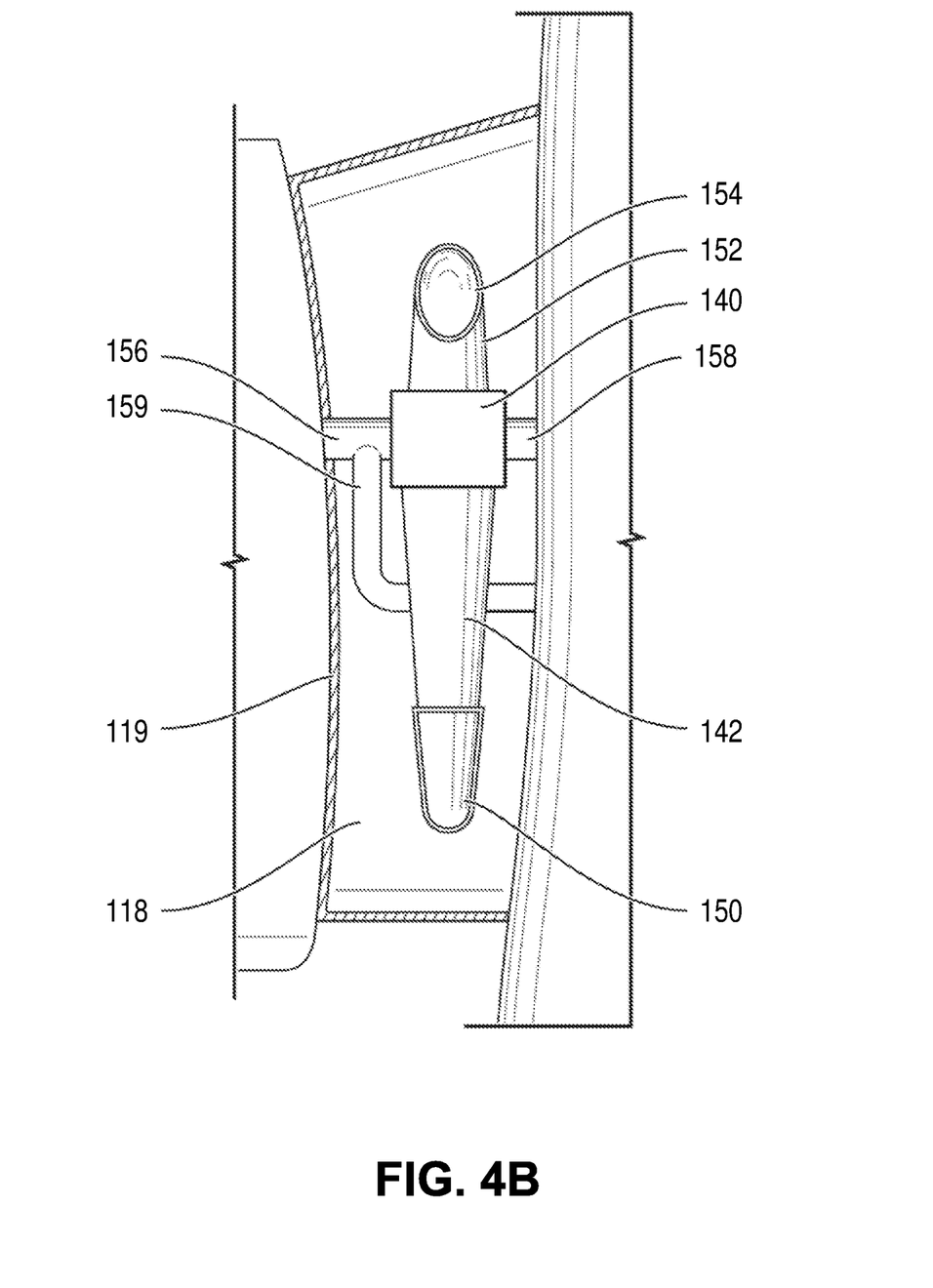
FIG. 4B is a bottom view of the pylon of FIG. 4A, with the outer skin shown as transparent to show internal components.
Figure 4C:
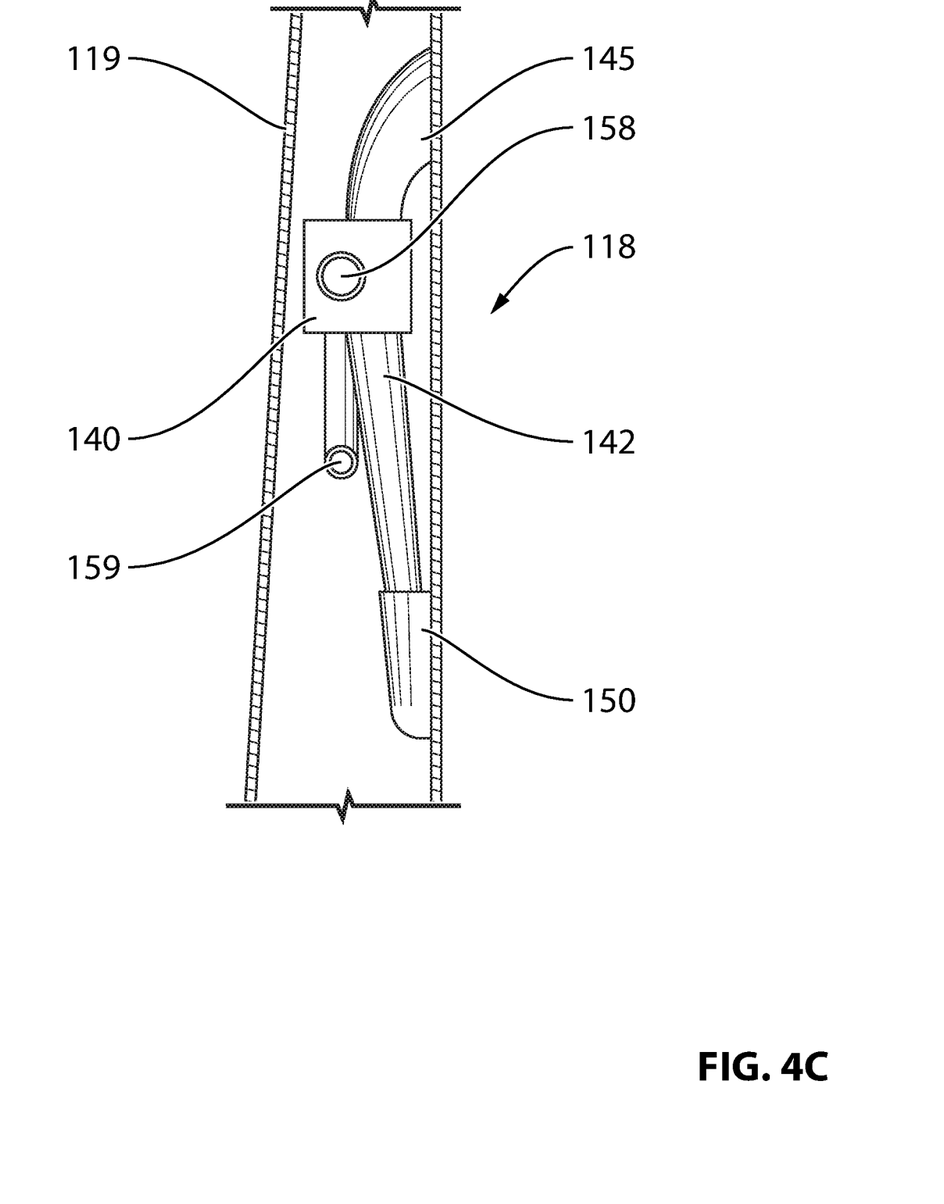
FIG. 4C is a side view of the pylon of FIG. 4A, with the outer skin shown as transparent to show internal components.

FIGS. 4A and 4B depict perspective and bottom views, respectively, of an example pylon 118 and engine nacelle 134 of aircraft 100, as indicated by the region labelled III in FIG. 1. FIG. 4C depicts a side view of pylon 118, with the outer skin depicted as being transparent in order to show internal components.

Pylon 118 has one or more internal ribs 147 which provide structural support and bear loads, such as engine loads, during flight. Ribs 147 may extend in the transverse direction of aircraft 100 and may, for example, have top and bottom flanges connected by a web section.

Pylon heat exchanger 140 may be installed to one or more of internal ribs 147 within pylon 118. For example, pylon heat exchanger 140 may be fastened (e.g. bolted, riveted or the like) to internal ribs 147. In some embodiments, pylon heat exchanger 140 may occupy the space between the top and bottom flanges of a rib 147, and may abut the web. Ambient air supply duct 142 and pylon heat exchanger 140 may together occupy the longitudinal space between two ribs 147.

As best shown in FIGS. 4A-4B, ambient air supply duct 142 has an inlet 150 for receiving external ambient air flowing over/around aircraft 100 into ambient air supply duct 142.

Inlet 150 may be a ram air inlet. Specifically, during flight, ambient air flowing over aircraft 100 may enter ambient air supply duct 142 through inlet 150 with high dynamic pressure due to motion of aircraft 100, and relatively low static pressure. Inlet 150 and ambient air supply duct 142 may be configured to decelerate the inflowing ambient air and convert dynamic pressure to static pressure. Thus, air in ambient air supply duct 142 may be pressurized due to movement of the aircraft 100.

In some embodiments, inlet 150 may be a hole in skin 119 of pylon 118. In such embodiments, inlet 150 may be recessed. That is, inlet 150 may not protrude from the contour of pylon 118. Inlet 150 may be shaped to limit drag created relative to the amount of airflow therethrough, and to maximize the energy recovered in the form of pressure. In some embodiments, inlet 150 may be a law-drag, generally triangular recessed opening with diverging side walls 151 and a ramp 153 oriented at a shallow angle to skin 119 of pylon 118. Such an inlet may be referred to as a NACA inlet or NACA duct.

Ambient air supply duct 142 routes pressurized air from inlet 150 to a cold-side intake of pylon heat exchanger 140. Pressure in ambient air supply duct 142 may force ambient air through pylon heat exchanger 140 to promote cooling performance.

Pylon heat exchanger 140 has a cold-side outlet which communicates with an exhaust duct 152. Exhaust duct 152 routes air from pylon heat exchanger 140 to an overboard outlet 154, which may be an opening in skin 119 of pylon 118 which does not protrude from the contours thereof. In some embodiments, outlet 154 may have a generally elliptical shape such as a flush oval. In other embodiments, outlet 154 may have different shapes. Oval outlet 154 may have lower drag than outlets of other shapes such as squares. Optionally, outlet 154 may be provided with louvers to further reduce drag.

As noted, pylon 118 may further have an engine-heated air supply duct 156. Engine-heated air supply duct 156 is configured to receive engine-heated air from engine nacelle 134 and route the engine-heated air to a hot-side intake of pylon heat exchanger 140. The pylon heat exchanger 140 extracts heat from the engine-heated air by thermal contact with ambient air supplied through intake 150 and duct 142.

In some embodiments, engine-heated air supply duct 156 may receive engine-heated air directly from engines 106. Such air may be admitted from multiple stages of engine 106, e.g. a low pressure compressor stage 128-1, and a high-pressure compressor stage 128-2. Air from different compressor stages may be mixed to obtain a temperature and pressure intermediate to those at low-pressure compressor stage 128-1 and high-pressure compressor stage 128-2.

Pylon 118 may have a heat exchanger output duct 158 in communication with a hot side outlet of pylon heat exchanger 140. Heat exchanger output duct 158 routes air to an air management system of aircraft 100 after cooling by pylon heat exchanger 140. In some examples, the air management system is a cabin environmental control system 122. However, pylon heat exchanger 140 may supply other kinds of aircraft systems.

Thus, pylon heat exchanger 140 may cool engine-heated air received via engine-heated air supply duct 156 to a temperature acceptable for cabin environmental control system 122. The maximum allowable temperature for cabin environmental control system 122 may be limited, for example, by safety considerations, e.g. flammability, efficiency of environmental control system 122, passenger comfort, and the like.

In some embodiments, wing anti-ice system 120 may be capable of receiving and using air at higher temperatures than cabin environmental control system 122. For example, wing anti-ice system 120 may operate by directing engine-heated air to warm aerodynamic skin surfaces of aircraft.

Pylon 118 may therefore have an anti-ice outlet duct 159 in communication with engine-heated air supply duct 156 upstream of pylon heat exchanger 140. Anti-ice outlet duct 159 may route engine-heated air from engine-heated air supply duct 156 to wing anti-ice system 120. Removal of some engine-heated air through anti-ice outlet duct 159 may reduce the amount of engine-heated air flowing through pylon heat exchanger 140. This may, in turn, improve cooling performance of pylon heat exchanger 140. That is, pylon heat exchanger 140 may be able to achieve a greater temperature drop with a smaller quantity of engine-heated air flowing therethrough.

Optionally, one or more additional heat exchangers may be provided in engine nacelle 134. For example, FIGS. 2 and 4 depict one such nacelle heat exchanger 160.

As depicted, nacelle heat exchanger 160 is positioned within the cowling of nacelle 134, but outside bypass duct 133. Nacelle heat exchanger 160 may be any suitable type of heat exchanger, with a hot side and a cold side. For example, nacelle heat exchanger 160 may be a fin or tube-and-fin heat exchanger.

The hot side of nacelle heat exchanger 160 may receive engine-heated air from engine 106. For example, as best depicted in FIG. 2, an engine-heated air supply duct 162 may communicate with a series of inlets, each of which admits airflow from a region of engine 106. In the depicted example, engine-heated air supply duct 162 has two inlets 166, 168 communicating with engine 106. Inlet 166 communicates with engine 106 proximate a low-pressure compressor stage 128, and inlet 168 communicates with engine 106 proximate a high-pressure compressor stage 128. In an example, engine 106 may have 10 compressor stages, and inlet 166 communicates with engine 106 proximate the fourth compressor stage, and inlet 168 communicates with engine 106 proximate the tenth compressor stage.

The cold side of nacelle heat exchanger 160 may receive air from bypass duct 133. In particular, a cold air supply duct 170 may connect the cold side of nacelle heat exchanger 160 with an inlet 164 in communication with bypass duct 133. Fan 124 may force air through inlet 164 and into cold air supply duct 170 under pressure.

The cold side of nacelle heat exchanger 160 may communicate with an exhaust duct 172. Exhaust duct 172 may route cooling air from nacelle heat exchanger 160 to an outlet 174 through which exhaust air may be discharged overboard. Alternatively or additionally, air may be discharged into engine bypass duct 133.

Outlet 174 may be formed as an opening in the skin of nacelle 134. Outlet 174 may be configured (e.g., recessed) for low drag and may be positioned at a location on nacelle 134 where airflow creates low pressure during flight. Low pressure proximate outlet 174 may create suction to urge air out through exhaust duct 172 and outlet 174. Thus, cooling air may be urged through nacelle heat exchanger 160 by the combination of positive pressure in cold air supply duct 170 due to fan 124 and negative pressure in exhaust duct 172 due to low pressure around outlet 174. This may increase the cooling capacity of nacelle heat exchanger 160 relative to a heat exchanger without forced airflow.

The hot side of nacelle heat exchanger 160 may be connected with engine-heated air intake duct 156 of pylon heat exchanger 140. The connection may be direct, or by way of one or more intermediate ducts and valves (not shown).

Thus, engine-heated air may flow from engine stages (e.g. compressor stages) into nacelle heat exchanger 160 in nacelle 134, where it may be cooled. The resulting cooled engine-heated air may be provided by way of intake duct 156 to pylon heat exchanger 140 in pylon 118 and to wing anti-ice system 120 by way of output duct 159.

Nacelle heat exchanger 160 in nacelle 134 may cool engine-heated air to a first threshold temperature acceptable for routing to wing anti-ice system 122 and to pylon heat exchanger 140. Pylon heat exchanger 140 in pylon 118 may further cool the engine-heated air to a second threshold temperature acceptable for routing to cabin environmental control system 120. Pylon heat exchanger 140 may be smaller (e.g. by volume) than nacelle heat exchanger 160. In some examples, pylon heat exchanger may be approximately 10%-50% of the volume of nacelle heat exchanger 160. The hot side of nacelle heat exchanger 160 may output air at a first, high temperature set point for routing to wing anti-ice system 120 and to pylon heat exchanger 140. The hot side of pylon heat exchanger 140 may output air at a second, relatively lower temperature set point for routing to cabin environmental control system 122.

Figure 5:
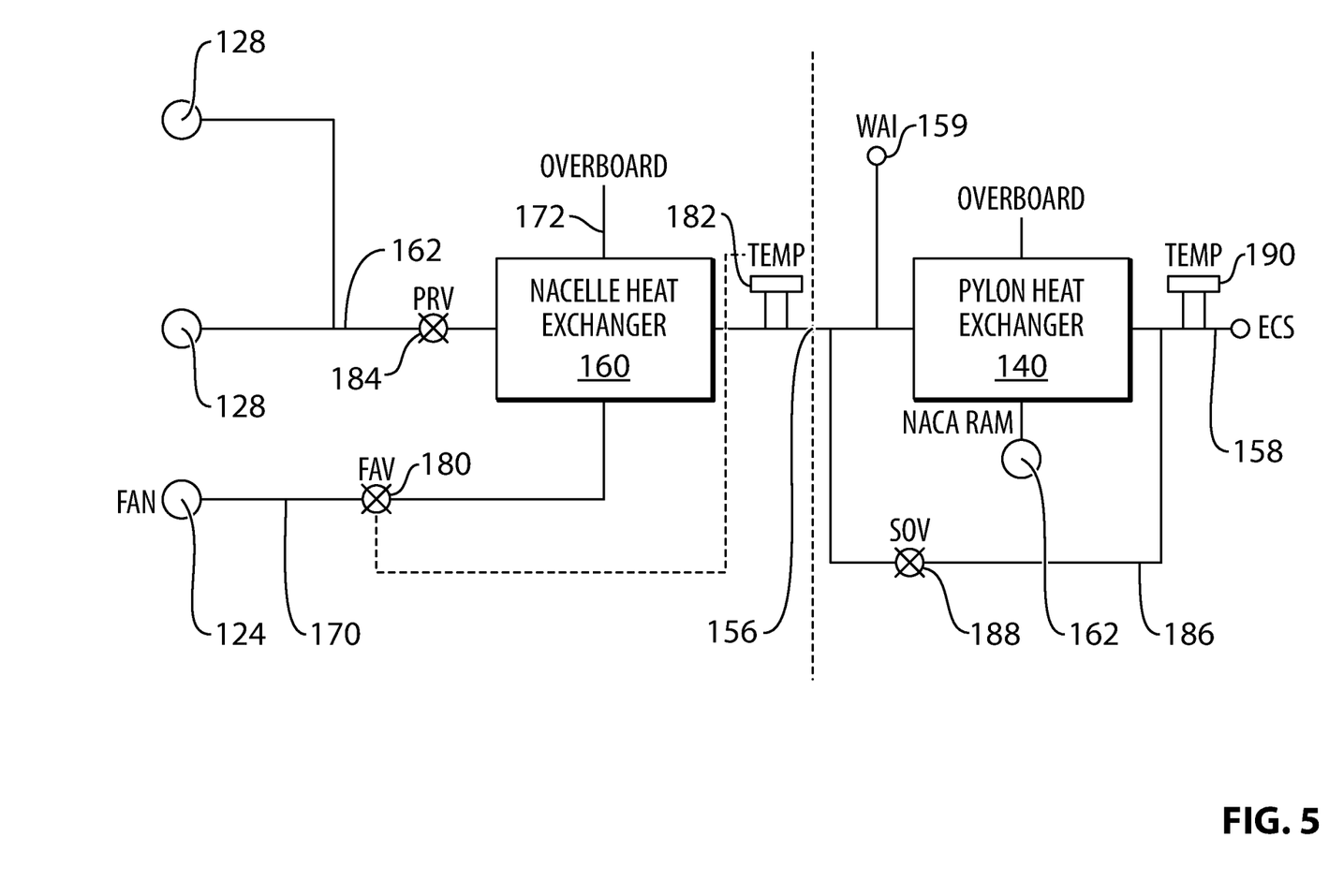
FIG. 5 is a schematic diagram showing airflow within the aircraft of FIG. 1.

FIG. 5 depicts a schematic view of heat exchangers 140, 160 and associated components such as ducts and flow control components.

As noted, nacelle heat exchanger 160 is supplied on the cold side through cold air supply duct 170, which admits air from bypass duct 133 of engine 106 under pressure from fan 124. On the hot side, nacelle heat exchanger 160 is supplied by way of engine-heated air supply duct 162 with a mixture of hot, pressurized air from inlets proximate a high-pressure compressor stage 128 of engine 106 and a low pressure compressor stage 128 of engine 106. On the hot side, nacelle heat exchanger 160 outputs air to an outlet in communication with second engine-heated air supply duct 156. On the cold side, nacelle heat exchanger 160 outputs air to an exhaust outlet 174 by way of an exhaust duct 172.

A control valve 180 may be provided in cold air supply duct 170 for controlling the amount of cold air supplied to nacelle heat exchanger 160. Control valve 180 may be operated in dependence on a signal from a temperature probe 182 (e.g., a thermocouple) positioned at the hot-side outlet of nacelle heat exchanger 160. That is, control valve 180 may open to admit more cooling air if temperature probe 182 indicates a temperature higher than desired, and may close to restrict flow of cooling air if temperature probe 182 indicates a temperature lower than desired. Additionally or alternatively, a control valve 180 may be positioned downstream of the hot-side output of nacelle heat exchanger 160 for admitting cooling air into the output air stream if temperature probe 182 indicates an excessive air temperature.

A pressure regulating valve 184 may be provided in engine-heated air supply duct 162. Pressure regulating valve 184 may be configured to limit downstream pressure to a set level. Specifically, pressure regulating valve 184 may constrict to regulate pressure downstream. Pressure regulating valve 184 may be adjustable, such that pressure may be regulated in accordance with a particular installation and set of operating conditions. Such regulation of pressure may guard against damage to nacelle heat exchanger 160 and other components downstream of the pressure regulating valve 184.

Cooled engine-heated air exiting the hot side of nacelle heat exchanger 160 flows into engine-heated air supply duct 156, which communicates with a hot side inlet of pylon heat exchanger 140. A portion of air in engine-heated air supply duct 156 may be diverted to wing anti-ice system 120. Remaining air flows into the hot side of pylon heat exchanger 140 to be further cooled.

Cold air flows into pylon 118 through inlet 150 and is routed through cold air intake duct 142 to pylon heat exchanger 140. Due to motion of aircraft 100, air flows into inlet 150 at high apparent velocity relative to aircraft 100. Equalization of velocity between aircraft 100 and air passing through inlet 150 may create elevated static pressure in intake duct 142.

Cold air exits the cold side of pylon heat exchanger 140 and is routed through exhaust duct 152 to outlet 154, where it is discharged overboard.

Cooled air exits the hot side of pylon heat exchanger 140 and is routed to cabin environmental control system 122 by way of output duct 158. A heat exchanger bypass duct 186 may interconnect engine-heated air supply duct 156 and output duct 158. Air in engine-heated air supply duct 156 may be hotter than that in output duct 158, such that directing airflow around pylon heat exchanger 140 increases temperature in output duct 158.

Heat exchanger bypass duct 186 has a bypass valve 188 therein for controlling flow of air through heat exchanger bypass duct 186. Bypass valve 188 may be operated in dependence on a signal from a temperature probe 190 (e.g. a thermocouple) positioned at the hot side outlet of pylon heat exchanger 140. Specifically, bypass valve 188 may open only if the signal from the temperature probe indicates more than a threshold temperature. The amount and timing of opening of bypass valve 188 may depend on the difference between the temperature reported by probe 190 and a target temperature.

Figure 6:
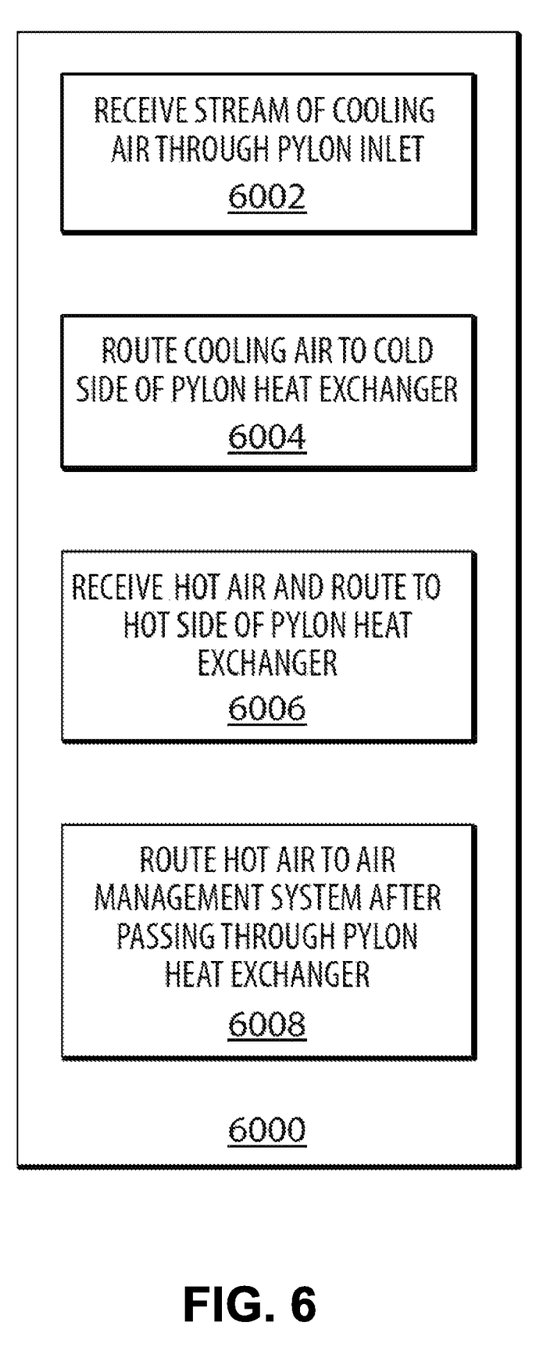
FIG. 6 is a flow chart depicting a method of conditioning engine bleed air onboard an aircraft.

FIG. 6 depicts a process 6000 of conditioning engine-heated air onboard an aircraft, according to embodiments.

At block 6002, air is received into pylon 118. In particular, air is received through inlet 150. Pressure of the air may be increased due to motion of aircraft 100, as relative velocity of the air and aircraft 100 is reduced. At block 6004, the received air is routed to a cold side of pylon heat exchanger 140 in the pylon.

At block 6006, engine-heated air is received at a duct in the pylon and the engine-heated air is routed to the hot side of pylon heat exchanger 140. The engine-heated air may be received from an engine 106 of aircraft 100. In some embodiments, the engine-heated air is received directly from engine 106. Alternatively, the engine-heated air may be routed from engine 106 to nacelle heat exchanger 160 located in nacelle 134. In some embodiments, a cold side of the nacelle heat exchanger 160 may receive cold air from bypass duct 133 of engine 106, under pressure from intake fan 124. A portion of the engine-heated air may be routed to wing anti-ice system 120.

At block 6008, cooled air exits the hot side of pylon heat exchanger 140 and is routed to the air management system. In some embodiments, the air management system is a cabin environmental control system.

In some embodiments, engine-heated air may be routed from the engine-heated air intake duct 156 to an output duct 158 communicating with the air management system, bypassing the pylon heat exchanger.

Conveniently, nacelle heat exchanger 160 and pylon heat exchanger 140 may provide sufficient cooling to reduce the temperature of engine air to a level suitable for use in a cabin environmental control system. However, nacelle heat exchanger 160 and pylon heat exchanger 140 may require less space within engine nacelle 134, relative to a system with only a single heat exchanger located in the nacelle.

Nacelle heat exchanger 160 and pylon heat exchanger 140 are arranged in serial flow relationship, with an outlet at an intermediate cooling stage for providing engine-heated air to wing anti-ice system 120. The heat exchangers may be arranged to provide output air at multiple different temperatures, without need for a heat exchanger with multiple outlets, or other more complicated components.

As described above, aircraft 100 has two heat exchangers 140,160, arranged in series, with nacelle heat exchanger 160 located in a nacelle 134 and pylon heat exchanger 140 located within pylon 118. Nacelle heat exchanger 160 cools engine-heated air received from an engine 160 before routing it to pylon heat exchanger 140. However, in other embodiments, multiple heat exchangers may be located within pylon 118, arranged in series or otherwise. Alternatively, a single pylon heat exchanger 140 may be located within pylon, and may receive engine-heated air directly from engine 106.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the detailed embodiments described above and illustrated are intended to be examples only. The invention is defined by the appended claims.

What is claimed is:

1. An assembly for conditioning engine-heated air onboard an aircraft, the assembly comprising:
   a pylon structure for supporting an engine of the aircraft, said pylon structure defining an internal volume;
   a pylon heat exchanger at least partially disposed in the internal volume defined by the pylon structure, the pylon heat exchanger being configured to use a flow of ambient air to extract heat from a flow of engine-heated air; and
   a ram air inlet for receiving the flow of ambient air for use by the heat exchanger, the ram air inlet including an inlet recessed in an outer skin of the pylon structure.

2. The assembly of claim 1, comprising an engine-heated air supply duct in fluid communication with a nacelle heat exchanger located in an engine nacelle of said aircraft to route said flow of engine-heated air to said pylon heat exchanger.

3. The assembly of claim 2, wherein said engine-heated air supply duct has an outlet for routing engine-heated air to a wing anti ice system.

4. The assembly of claim 1, comprising an output duct in fluid communication with an environmental control system of said aircraft for routing said engine-heated air to said environmental control system after passing through said pylon heat exchanger.

5. The assembly of claim 1, wherein said ram air inlet is configured to convert dynamic pressure of said ambient air flow due to motion of said aircraft into static pressure.

6. The assembly of claim 1, wherein said ram air inlet comprises a NACA inlet.

7. The assembly of claim 1, further comprising an exhaust outlet formed in the outer skin of said pylon structure for discharging air from said pylon heat exchanger.

8. The assembly of claim 1, further comprising a bypass duct for routing engine-heated air around said pylon heat exchanger to an output communicating with a system of said aircraft.

9. The assembly of claim 1, wherein said pylon structure is configured to secure the engine to a fuselage of said aircraft.

10. The assembly of claim 1, wherein said pylon heat exchanger is fastened to a structural rib of said pylon structure.

11. The assembly of claim 10, wherein said pylon heat exchanger abuts said structural rib.

12. An aircraft comprising the assembly of claim 1.

13. The aircraft of claim 12, wherein said aircraft comprises a wing anti-ice system and a duct for routing air from said flow of engine-heated air to said wing anti-ice system.

14. A method of conditioning engine-heated air onboard an aircraft, comprising:
   receiving a flow of ambient air into a pylon of the aircraft through a ram air inlet including an inlet recessed in an outer skin of the pylon;
   routing said flow of ambient air to a pylon heat exchanger at least partially disposed in the pylon; and
   extracting heat from a flow of engine-heated air with said pylon heat exchanger.

15. The method of claim 14, comprising converting dynamic pressure of said flow of ambient air to static pressure.

16. The method of claim 14, comprising routing the flow of engine-heated air through a nacelle heat exchanger located upstream of the pylon heat exchanger in an engine nacelle of said aircraft.

17. The method of claim 14, comprising routing said engine-heated air around said pylon heat exchanger to an output duct in communication with a system of said aircraft, bypassing said pylon heat exchanger.

18. The method of claim 14, comprising routing said engine-heated air, after cooling, to an environmental control system.

19. The method of claim 14, comprising receiving said engine-heated air at an input duct in communication with said pylon heat exchanger and routing engine-heated air from said duct to a wing anti-ice system of said aircraft.

20. An assembly for conditioning engine-heated air onboard an aircraft, the assembly comprising:
- a pylon structure for supporting an engine of the aircraft, said pylon structure defining an internal volume;
- a heated air supply duct disposed at least partially within said internal volume for directing a flow of engine-heated air to a pylon heat exchanger;
- a ram air inlet for receiving a flow of ambient air for use by the pylon heat exchanger to extract heat from said flow of engine-heated air, the ram air inlet including an inlet recessed in an outer skin of the pylon structure; and
- an ambient air supply duct disposed at least partially within said internal volume for directing said flow of ambient air from said ram air inlet to the pylon heat exchanger.

* * * * *